United States Patent
Leng et al.

(10) Patent No.: US 11,367,002 B1
(45) Date of Patent: Jun. 21, 2022

(54) METHOD FOR CONSTRUCTING AND TRAINING DECENTRALIZED MIGRATION DIAGRAM NEURAL NETWORK MODEL FOR PRODUCTION PROCESS

(71) Applicant: GUANGDONG UNIVERSITY OF TECHNOLOGY, Guangzhou (CN)

(72) Inventors: Jiewu Leng, Guangzhou (CN); Weinan Sha, Guangzhou (CN); Zisheng Lin, Guangzhou (CN); Dewen Wang, Guangzhou (CN); Man Zhou, Guangzhou (CN); Guolei Ruan, Guangzhou (CN); Qiang Liu, Guangzhou (CN); Hu Zhang, Guangzhou (CN); Qianyi Su, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/529,311

(22) Filed: Nov. 18, 2021

(30) Foreign Application Priority Data

Jan. 6, 2021  (CN) .......................... 202110010986.0

(51) Int. Cl.
   *G06N 3/04* (2006.01)
   *G06N 3/08* (2006.01)
   *G06K 9/62* (2022.01)
   *G05B 13/02* (2006.01)

(52) U.S. Cl.
   CPC ............. *G06N 3/08* (2013.01); *G05B 13/021* (2013.01); *G05B 13/024* (2013.01); *G05B 13/027* (2013.01); *G06K 9/628* (2013.01); *G06K 9/6262* (2013.01); *G06K 9/6277* (2013.01); *G06K 9/6296* (2013.01); *G06N 3/0481* (2013.01)

(58) Field of Classification Search
   None
   See application file for complete search history.

(56) References Cited

U.S. PATENT DOCUMENTS

| | | | |
|---|---|---|---|
| 7,831,416 B2 | 11/2010 | Grichnik et al. | |
| 10,296,258 B1 | 5/2019 | Richardson et al. | |
| 11,112,989 B2 | 9/2021 | Richardson | |
| 2019/0026624 A1 | 1/2019 | Steiner et al. | |
| 2021/0383187 A1* | 12/2021 | Kalyan | ............... H04L 41/0893 |

FOREIGN PATENT DOCUMENTS

| | | |
|---|---|---|
| CN | 108268638 A | 7/2018 |
| CN | 109032671 A | 12/2018 |
| CN | 110348854 A | 10/2019 |
| CN | 110929029 A | 3/2020 |
| CN | 111552797 A | 8/2020 |
| CN | 112100442 A | 12/2020 |

* cited by examiner

*Primary Examiner* — David R Vincent
(74) *Attorney, Agent, or Firm* — True Shepherd LLC; Andrew C. Cheng

(57) ABSTRACT

A method for constructing and training a Decentralized Migration Diagram Neutral Network (DMDNN) model for a production process, including: determining a production task input management node, distributed management nodes and a granularity of each of the distributed management nodes, and constructing a production system network; constructing network calculation nodes on each of the distributed management nodes; constructing and training a DMDNN model; and applying the trained DMDNN model in management and control of the production process.

5 Claims, 1 Drawing Sheet

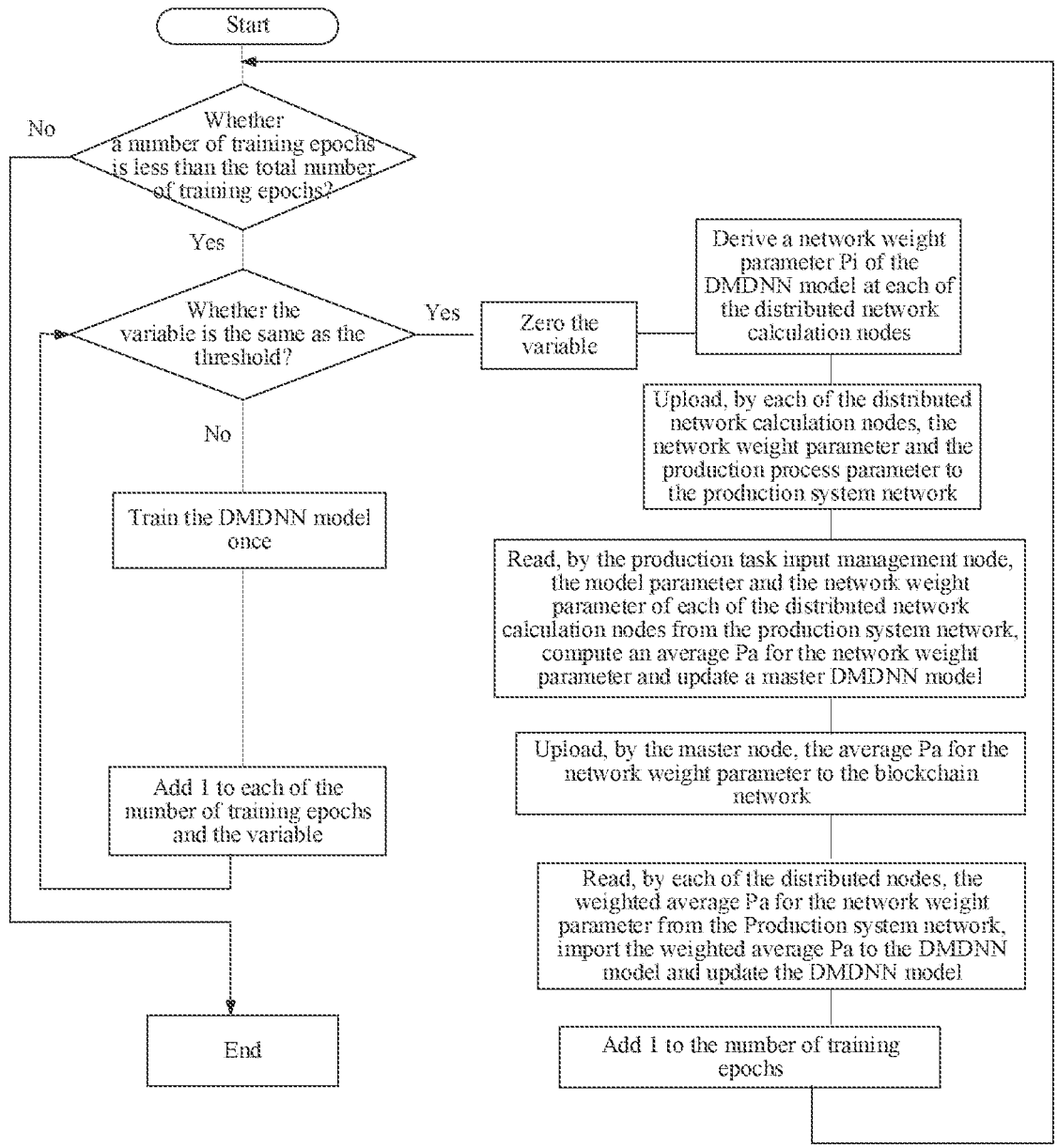

METHOD FOR CONSTRUCTING AND TRAINING DECENTRALIZED MIGRATION DIAGRAM NEURAL NETWORK MODEL FOR PRODUCTION PROCESS

CROSS-REFERENCE TO RELATED APPLICATIONS

This application claims priority to Chinese Patent Application No. 202110010986.0 with a filing date of Jan. 6, 2021. The content of the aforementioned application, including any intervening amendments thereto, is incorporated herein by reference.

TECHNICAL FIELD

The present disclosure relates to the technical field of information, and in particular, to a method for constructing and training a Decentralized Migration Diagram Neural Network (DMDNN) model for a production process.

BACKGROUND

The manufacturing of complex products goes through long processes among distributed workshops and factories. Massive data are generated and distributed in different production management servers. These data usually could not be directly gathered in a central management server due to privacy protection and data security concerns. How to use these distributed manufacturing data for mining useful decision-making knowledge is challenging.

For distributed industrial production environments with massive scattered data, higher requirements are put forward on the computational capacity to train deep neural network models, which makes the training time-consuming, and the model trained inefficiently. Moreover, due to changeable production conditions of the industrial production environments, deep learning algorithmic models trained with production data in specific production conditions are undesirable for other production conditions and the trained algorithmic models exhibit poor generalization performance and transferability. Therefore, the conventional deep learning methods are not effective enough for the distributed industrial production environments with changeable production conditions.

SUMMARY

An objective of the present disclosure is to provide a method for constructing and training a DMDNN model for a production process.

To achieve the above objective, the present disclosure adopts the following technical solutions:

A method for constructing and training a DMDNN model for a production process includes the following steps:

step A: determining a decentralized migration diagram learning requirement according to the production process, and determining a production task input management node, distributed management nodes, and a granularity of each of the distributed management nodes according to the decentralized migration diagram learning requirement;

step B: determining a number of distributed management nodes in a production system network and constructing network calculation nodes on each of the distributed management nodes;

step C: acquiring a production process parameter for each of the distributed management nodes according to the granularity, constructing a DMDNN model according to the production process parameter, and deploying the DMDNN model to each of the distributed management nodes in the production system network; and step D: setting a threshold for parameter update and a total number of training epochs, and training the DMDNN model, the threshold for parameter update and the total number of training epochs each being a constant; and setting a variable for counting the training epochs, the variable and a number of training epochs each having an initial value of 0;

step E: applying the trained DMDNN model in management and control of the production process;

wherein step D comprises the following steps:

step D1: determining whether the number of training epochs is not less than the total number of training epochs, entering step D2 if yes, else ending model training;

step D2: determining whether the variable is the same as the threshold for parameter update or is an integral multiple of the threshold for parameter update, entering step D5 if yes, else entering step D4;

step D4: training the DMDNN model at each of the distributed network calculation nodes once; adding 1 to each of the variable and the number of training epochs; and going back to step D2;

step D5: zeroing the variable; and deriving a network weight parameter $p_i$ of the DMDNN model at each of the distributed network calculation nodes, respectively uploading the network weight parameter $p_i$ and the production process parameter to the production system network, and entering step D6;

step D6: acquiring, by the production task input management node, the network weight parameter $p_i$ and the production process parameter of each of the distributed network calculation nodes from the production system network, and taking a weighted average $$p_a = \frac{1}{n}\sum_{i=0}^{n} w_i p_i$$

for the network weight parameter, n being a number of distributed management nodes and $w_i$ being a weight of an ith node; loading the weighted average $p_a$ to a DMDNN model of the production task input management node, and releasing the weighted average $p_a$ to the production system network; and entering step D7;

step D7: acquiring, by each of the distributed network calculation nodes, the weighted average $p_a$ from the production system network, loading the weighted average $p_a$ to the DMDNN model of each of the distributed network calculation nodes, and updating the DMDNN model; and entering step D8; and step D8: adding 1 to the number of training epochs, and going back to step D1.

Preferably, the production process is defined as a directed graph G, and step C may include:

a production process parameter acquisition stage, specifically, acquiring training data of a DMDNN model corresponding to each of the distributed management nodes, wherein:

each of the production procedures in the directed graph G serves as one node v, and a plurality of machining attributes included in the node v is represented by a high-dimensional tensor;

a shift relation between the production procedures in the directed graph G serves as an edge e, and a plurality of transportation attributes included in the edge e are represented by a high-dimensional tensor; and all nodes v form a node-set V of the directed graph, all edges e form an edge set E of the directed graph, and the directed graph G=(V, E);

a DMDNN model construction stage, specifically, setting a feature matrix X having a dimension of N×F⁰ to represent the nodes v in the directed graph G, where N represents a number of the nodes v in the directed graph, and F⁰ represents machining attributes of each of the nodes v;

setting an adjacency matrix A having a dimension of N×N to represent a link relation between the nodes v in the directed graph G; and constructing, with the feature matrix X and the adjacency matrix A as an input of the DMDNN model, the DMDNN model according to the feature matrix X and the adjacency matrix A; and a DMDNN model deployment stage, specifically, deploying the DMDNN model to the distributed management nodes in the production system network.

Preferably, step C may further include: setting a forward propagation manner of the DMDNN model as:

$$H^{(l+1)} = \sigma\left(D - \frac{1}{2}AD - \frac{1}{2}H^{(l)}W^{(l)}\right),$$

where, σ is an activation function that is a rectified linear unit (ReLU), $H^{(l)}$ is a presentation state of the directed graph on an lth convolutional layer, $H^{(0)}$=X, $W^{(l)}$ is a weight matrix of the lth convolutional layer, and D is a degree that each element on a diagonal line of a diagonal matrix represents a node in the directed graph G.

Preferably, step C may further include: acquiring historical production data, selecting a plurality of original data from the historical production data, attaching a classification label to each of the original data, and randomly segmenting the original data according to a ratio of training set:validation set:test set=7:2:1.

Preferably, step C may further include: determining a problem of the DMDNN model upon a forward training process of the DMDNN model, and selecting a cross-entropy loss function according to the problem, wherein if the problem is a binary classification problem, the cross-entropy loss function is:

$$L' = -(y \cdot \log(\hat{y}) + (1-y) \cdot \log(1-\hat{y})),$$

where, ŷ is a probability that a predicted data sample of the DMDNN model is a positive and y is a classification label of the data sample; if the classification label of the data sample indicates the positive, y=1; and if the classification label of the data sample indicates a negative, y=0; and if the problem is a multi-class classification problem, the cross-entropy loss function is:

$$L' = \log(\text{Loss}) = \sum_{j=1}^{J} y_j \log \hat{y}_j + (1-y_j)\log(1-\hat{y}_j),$$

wherein, J is a number of data samples, j is a jth data sample in the data samples, $\hat{y}_j$ is a probability that a predicted sample of the DMDNN model is the jth data sample, and $y_j$ is a classification label of the jth data sample.

The present disclosure has the following beneficial effects: With the introduction of a transfer algorithm, the present disclosure is implemented by training DMDNN models respectively with different data of different distributed management nodes, performing weighting fusion on different network weight parameters of the DMDNN models trained by the distributed management nodes, and enabling a production task input management node to generate a network weight parameter of a master DMDNN model. In this way, the final master DMDNN model is well suited for data of each of the distributed management nodes and thus the present disclosure can effectively improve the generalization performance of the DMDNN model, implement the transfer in a broad sense and make the artificial intelligence (AI) applied in a large scale.

BRIEF DESCRIPTION OF THE DRAWINGS

The accompanying drawings further describe the present disclosure. However, the contents in the accompanying drawings do not form any limit to the present disclosure.

FIG. 1 is a schematic flow chart of a training process according to an embodiment of the present disclosure.

DETAILED DESCRIPTION OF THE EMBODIMENTS

The technical solutions of the present disclosure will be further described below through the detailed description in connection with the accompanying drawings.

A method for constructing and training a DMDNN model for a production process in the embodiment includes the following steps:

Step A: determining a decentralized migration diagram learning requirement according to the production process, and determining a production task input management node, distributed management nodes, and a granularity of each of the distributed management nodes according to the decentralized migration diagram learning requirement.

Step B: determining a number of distributed management nodes in a production system network and constructing network calculation nodes on each of the distributed management nodes.

Step C: acquiring a production process parameter for each of the distributed management nodes according to the granularity, constructing a DMDNN model according to the production process parameter, and deploying the DMDNN model to each of the distributed management nodes in the production system network.

Step D: setting a threshold for parameter update and a total number of training epochs, and training the DMDNN model, the threshold for parameter update and the total number of training epochs each being a constant; and setting a variable for counting training epochs, the variable and the number of training epochs each having an initial value of 0.

Step E: applying the trained DMDNN model in management and control of the production process.

wherein step D comprises the following steps:

Step D1: determining whether the number of training epochs is not less than the total number of training epochs, entering step D2 if yes, else ending model training;

Step D2: determining whether the variable is the same as the threshold for parameter update or is an integral multiple of the threshold for parameter update, entering step D5 if yes, else entering step D4;

Step D4: training the DMDNN model at each of the distributed network calculation nodes once; adding 1 to each of the variable and the number of training epochs; and going back to step D2;

Step D5: zeroing the variable; and deriving a network weight parameter $p_i$ of the DMDNN model at each of the distributed network calculation nodes, respectively uploading the network weight parameter $p_1$ and the production process parameter to the production system network, and entering step D6;

Step D6: acquiring, by the production task input management node, the network weight parameter $p_1$ and the production process parameter of each of the distributed network calculation nodes from the production system network, and taking a weighted average $$p_a = \frac{1}{n}\sum_{i=0}^{n} w_i p_i$$

for the network weight parameter, n being a number of distributed management nodes and $w_i$ being a weight of an ith node; loading the weighted average $p_a$ to a DMDNN model of the production task input management node, and releasing the weighted average $p_a$ to the production system network; and entering step D7;

Step D7: acquiring, by each of the distributed network calculation nodes, the weighted average $p_a$ from the production system network, loading the weighted average $p_a$ to the DMDNN model of each of the distributed network calculation nodes, and updating the DMDNN model; and entering step D8; and Step D8: adding 1 to the number of training epochs, and going back to step D1.

Most existing AI algorithmic models are trained by integrating data together. With higher requirements on the computational capacity of hardware, such a centralized data storage and training mode reduces the training efficiency of the algorithmic models. Unlike the centralized training mode with integrated data processing, the present disclosure introduces a blockchain technology and is implemented by distributing data to distributed management nodes of the blockchain for storage and training a DMDNN model with local data in each of the distributed management nodes, thereby improving the training efficiency of the DMDNN models. In addition, while the AI is put into practice, the scare data (the small orders of magnitude of data/scarce labels), insufficient awareness of the operator for services and difficult generalization for the algorithm of "one model for one matter" all make the large-scale applications of the AI obstructed. One model is only applied to a particular case, with the effect far from satisfactory in other cases; and hence, there is an urgent need to improve the transferability of the algorithm. This is because the model only driven by local data hardly achieves the desirable global generalization performance and data recorded by systems are different and complementary to some extent. In this regard, with the introduction of a transfer algorithm, the present disclosure is implemented by training DMDNN models respectively with different data of different distributed management nodes, performing weighting fusion on different network weight parameters of the DMDNN models trained by the distributed management nodes, and enabling a production task input management node to generate a network weight parameter of a master DMDNN model. In this way, the final master DMDNN model is well suited for data of each of the distributed management nodes and thus the present disclosure can effectively improve the generalization performance of the DMDNN model, implement the transfer in a broad sense and make the AI applied in a large scale.

According to requirements in the actual production process, the method for constructing and training a DMDNN model of the present disclosure can be divided into two types, in which the first type is to predict related indicators in the production process through graph regression or node regression, and the second type is to provide related auxiliary decisions in the production process through matrix completion or link prediction. However, according to a range of data for training the DMDNN models, the distributed management nodes for training can participate in both a method for constructing and training a DMDNN model based on a large-granularity node and a method for constructing and training a DMDNN model based on a small-granularity node. The method for constructing and training a DMDNN model based on the large-granularity node takes the whole machining workshop as the node, while the method for constructing and training a DMDNN model based on the small-granularity node is to split a machining process in the production workshop into manufacturing cells and take each manufacturing cell as the node. The specific classification is implemented by analyzing a range of acquired original data according to specific requirements of the method for constructing and training a DMDNN model (including indicator prediction requirements and decision improvement requirements), and determining granularities of distributed management nodes according to the range of the data. For example, to make production decisions for maximizing revenues of the whole group, it is necessary to obtain production data of each branch of the group, and in this case, each branch serves as one node and the method for constructing and training a DMDNN model based on the large-granularity node is used. If there is a need to predict the fault in a procedure on a production line, production data of corresponding similar procedures on production lines of other similar products are used together to train the network model, with an intention of obtaining a better generalization effect of the model, and in this case, the procedure serves as the manufacturing cell and the method for constructing and training a DMDNN model based on the small-granularity node is used.

Upon the determination of the granularity of the distributed node, the specific distributed node can be selected. Each computer or cloud server for providing the training data serves as one distributed node, and it is assumed that there are n distributed management nodes. A production task input management node is added upon the determination of all distributed management nodes so as to train a master DMDNN model. There is one production task input management node and thus n+1 nodes in total for training the DMDNN models.

Further, the production process is defined as a directed graph G, Step C includes:

a production process parameter acquisition stage, specifically, acquire training data of a DMDNN model corresponding to each of the distributed management nodes, where:

each of production procedures in the directed graph G serves as one node v, and a plurality of machining attributes included in the node v are represented by a high-dimensional tensor;

a shift relation between the production procedures in the directed graph G serves as an edge e, and a plurality of transportation attributes included in the edge e are represented by a high-dimensional tensor; and all nodes v form a node set V of the directed graph, all edges e form an edge set E of the directed graph, and the directed graph G=(V,E);

a DMDNN model construction stage, specifically, set a feature matrix X having a dimension of N×F⁰ to represent the nodes v in the directed graph G, where N represents a number of the nodes v in the directed graph, and F⁰ represents machining attributes of each of the nodes v;

set an adjacency matrix A having a dimension of N×N to represent a link relation between the nodes v in the directed graph G; and construct, with the feature matrix X and the adjacency matrix A as an input of the DMDNN model, the DMDNN model according to the feature matrix X and the adjacency matrix A; and a DMDNN model deployment stage, specifically, deploy the DMDNN model to the production task input management node and each of the distributed management nodes in the production system network.

The flow chart in the production process can be viewed as the directed graph, and training data of corresponding DMDNN models can be devised according to the flow chart in the production process. With the main flow in assembly of the mobile phone as an example, each process in the assembly of the mobile phone can be viewed as the node v in the directed graph, and a plurality of machining attributes included in the node v can be represented by a high-dimensional tensor. The shift between procedures in the assembly of the mobile phone can be viewed as the edge e in the directed graph, and a plurality of transportation attributes included in the edge e can be represented by a high-dimensional tensor.

The machining attributes of the node v are such parameters as machining time and machining method in the procedure. According to different nodes v, the machining attributes vary in both number and type. The edge e represents a number of parameters during transportation between two procedures of a part, for example, the transportation attributes capable of affecting the final prediction result, such as transportation method, time, and spatial distance of the product from one procedure to the next procedure. The specific data are determined according to final requirements. All nodes v form the node-set V of the directed graph, and all edges e form the edge set E of the directed graph. Therefore, G=(V,E) can be used to represent the data in the directed graph of the main flow in the assembly of the mobile phone.

Further, Step C further includes: Set a forward propagation manner of the DMDNN model as:

$$H^{(l+1)} = \sigma\left(D - \frac{1}{2}AD - \frac{1}{2}H^{(l)}W^{(l)}\right),$$

where, σ is an activation function ReLU, $H^{(l)}$ is a presentation state of the directed graph on a lth convolutional layer, $H^{(0)}$=X, $W^{(l)}$ is a weight matrix of the lth convolutional layer, and D is a degree that each element on a diagonal line of a diagonal matrix represents a node in the directed graph G.

The graph convolutional neural network (GCNN) is used to extract features of production states of the workshop. Compared with the common convolutional neural networks (CNNs), the production states of the workshop are better described by the graph-structured data (network topology). As the GCNN is the feature extraction network dedicated to the directed graph-structured data, it can better extract implicit relations between the production states of the workshop and provide a better support for subsequent classification or other tasks.

Further, Step C may further include: Acquire historical production data, select a plurality of original data from the historical production data, attach a classification label to each of the original data, and randomly segment the original data according to a ratio of training set:validation set:test set=7:2:1.

Not all historical production data in the production process are available for training the DMDNN models. Hence, there is a need to screen the data and select a plurality of required original data therefrom. The original data each are then attached with a classification label. If the original data are data about the binary classification problem, a positive or negative label is attached, such as 1 for the positive and 0 for the negative. If the original data are data about the multi-class classification problem, the data are attached with the corresponding labels as required, for ease of the training on the DMDNN model with the original data. In addition, in order to obtain the better training effect of the DMDNN model, when the original data are segmented, the training set holds the most proportion; and in contrast, the validation set and the test set are used to validate and test the trained DMDNN model and thus hold a small proportion.

Further, the method further includes: Determine a problem of the DMDNN model upon a forward training process of the DMDNN model, and select an entropy loss function according to the problem.

If the problem is a binary classification problem, the entropy loss function is:

$$L' = -(y \cdot \log(\hat{y}) + (1-y) \cdot \log(1-\hat{y})),$$

where, $\hat{y}$ is a probability that a predicted data sample of the DMDNN model is a positive and y is a classification label of the data sample; if the classification label of the data sample indicates the positive, y=1; and if the classification label of the data sample indicates a negative, y=0. In the binary classification problem, the cross-entropy loss function can provide a basis for iteration of the DMDNN model.

If the problem is a multi-class classification problem, the cross-entropy loss function is:

$$L' = \log(\text{Loss}) = \sum_{j=1}^{J} y_j \log \hat{y}_j + (1-y_j)\log(1-\hat{y}_j),$$

where, J is a number of data samples, j is a jth data sample in the data samples, $\hat{y}_j$ is a probability that a predicted sample of the DMDNN model is the jth data sample, and $y_j$ is a classification label of the jth data sample.

Different cross-entropy loss functions are selected depending on the problems, such that the DMDNN model can be more suitable for the production process and the predicted structure of the DMDNN model is more accurate.

The technical principles of the present disclosure are described above with reference to the specific embodiments. These descriptions are merely intended to explain the principles of the present disclosure, and may not be construed as limiting the protection scope of the present disclosure in any way. Therefore, those skilled in the art may derive other specific implementations of the present disclosure without creative effort, but these implementations should fall within the protection scope of the present disclosure.

What is claimed is:

1. A method for constructing and training a Decentralized Migration Diagram Neural Network (DMDNN) model for a production process, comprising the following steps:

step A: determining a decentralized migration diagram learning requirement according to the production process, and determining a production task input management node, distributed management nodes and a granularity of each of the distributed management nodes according to the decentralized migration diagram learning requirement;

step B: determining a number of distributed management nodes in a production system network and constructing network calculation nodes on each of the distributed management nodes;

step C: acquiring a production process parameter for each of the distributed management nodes according to the granularity, constructing a DMDNN model according to the production process parameter, and deploying the DMDNN model to each of the distributed management nodes in the production system network; and step D: setting a threshold for parameter update and a total number of training epochs, and training the DMDNN model, the threshold for parameter update and the total number of training epochs each being a constant; and setting a variable for counting training epochs, the variable and a number of training epochs each having an initial value of 0;

step E: applying the trained DMDNN model in management and control of the production process;

wherein step D comprises the following steps:

step D1: determining whether the number of training epochs is not less than the total number of training epochs, entering step D2 if yes, else ending model training;

step D2: determining whether the variable is the same as the threshold for parameter update or is an integral multiple of the threshold for parameter update, entering step D5 if yes, else entering step D4;

step D4: training the DMDNN model at each of the distributed nodes once; adding 1 to each of the variable and the number of training epochs; and going back to step D2;

step D5: zeroing the variable; and deriving a network weight parameter $p_i$ of the DMDNN model at each of the distributed network calculation nodes, respectively uploading the network weight parameter $p_i$ and the production process parameter to the production system network, and entering step D6;

step D6: acquiring, by the production task input management node, the network weight parameter $p_i$ and the production process parameter of each of the distributed network calculation nodes from the production system network, and taking a weighted average $$P_a = \frac{1}{n}\sum_{i=0}^{n} w_i p_1$$

for the network weight parameter, n being a number of distributed management nodes and $w_i$ being a weight of an ith node; loading the weighted average $p_a$ to a DMDNN model of the production task input management node, and releasing the weighted average $p_a$ to the production system network; and entering step D7;

step D7: acquiring, by each of the distributed network calculation nodes, the weighted average $p_a$ from the production system network, loading the weighted average $p_a$ to the DMDNN model of each of the distributed network calculation nodes, and updating the DMDNN model; and entering step D8; and step D8: adding 1 to the number of training epochs, and going back to step D1, wherein the method further comprises a step of setting up a plurality of manufacturing cells that jointly construct the production process and wherein multiple cells of the plurality of manufacturing cells are selected to respectively construct the number of distributed management nodes; and wherein the multiple cells of the plurality of manufacturing cells that respectively construct the number of distributed management nodes are trained separately by individually training the DMDNN models of the number of the distributed management nodes and fusion weighting is performed on the DMDNN models of the number of distributed management nodes to establish a master DMDNN model that is applicable to each of the distributed management nodes.

2. The method according to claim 1, wherein the production process is defined as a directed graph G, and step C comprises:

a production process parameter acquisition stage, which conducts an operation of acquiring training data of a DMDNN model corresponding to each of the distributed management nodes, wherein each of production procedures in the directed graph G serves as one node v, and a plurality of machining attributes comprised in the node v are represented by a high-dimensional tensor;

a shift relation between the production procedures in the directed graph G serves as an edge e, and a plurality of transportation attributes comprised in the edge e are represented by a high-dimensional tensor; and all nodes v form a node set V of the directed graph, all edges e form an edge set E of the directed graph, and the directed graph G=(V, E);

a DMDNN model construction stage, which conducts following operations:

setting a feature matrix X having a dimension of N×F⁰ to represent the nodes v in the directed graph G, wherein N represents a number of the nodes v in the directed graph, and F⁰ represents machining attributes of each of the nodes v;

setting an adjacency matrix A having a dimension of N×N to represent a link relation between the nodes v in the directed graph G; and constructing, with the feature matrix X and the adjacency matrix A as an input of the DMDNN model, the DMDNN model according to the feature matrix X and the adjacency matrix A; and a DMDNN model deployment stage, specifically, deploying the DMDNN model to the distributed network calculation nodes in the production system network.

3. The method according to claim 2, wherein step C further comprises: setting a forward propagation manner of the DMDNN model as:

$$H^{(l+1)} = \sigma\left(D - \frac{1}{2}AD - \frac{1}{2}H^{(l)}W^{(l)}\right)$$

wherein, σ is an activation function that is a rectified linear unit (ReLU), $H^{(l)}$ is a presentation state of the directed graph on an lth convolutional layer, $H^{(0)}=X$, $W^{(l)}$ is a weight matrix of the lth convolutional layer, and D is a degree that each element on a diagonal line of a diagonal matrix represents a node in the directed graph G.

4. The method according to claim 3, wherein step C further comprises: acquiring historical production data, selecting a plurality of original data from the historical production data, attaching a classification label to each of the original data, and randomly segmenting the original data according to a preset ratio among a training set, a validation set, and a test set.

5. The method according to claim 4, wherein step C further comprises: determining a problem of the DMDNN model upon a forward training process of the DMDNN model, and selecting an entropy loss function according to the problem, wherein if the problem is a binary classification problem, the entropy loss function is:

$$L' = -(y \cdot \log(\hat{y}) + (1-y) \cdot \log(1-\hat{y})),$$

wherein, $\hat{y}$ is a probability that a predicted data sample of the DMDNN model is a positive and y is a classification label of the data sample; if the classification label of the data sample indicates the positive, y=1; and if the classification label of the data sample indicates a negative, y=0; and if the problem is a multi-class classification problem, the cross-entropy loss function is:

$$L' = \log(\text{Loss}) = \sum_{j=1}^{J} y_j \log \hat{y}_j + (1-y_j)\log(1-\hat{y}_j),$$

wherein, J is a number of data samples, j is a jth data sample in the data samples, $\hat{y}_j$ is a probability that a predicted sample of the DMDNN model is the jth data sample, and $y_j$ is a classification label of the jth data sample.

* * * * *